United States Patent

[11] 3,601,587

| [72] | Inventor | Paul W. Thiede |
| --- | --- | --- |
| | | Danville, Ill. |
| [21] | Appl. No. | 863,876 |
| [22] | Filed | Oct. 6, 1969 |
| [45] | Patented | Aug. 24, 1971 |
| [73] | Assignee | Hurletron Incorporated |
| | | Danville, Ill. |

[54] REGISTER CONTROL SYSTEM AND METHOD
4 Claims, 5 Drawing Figs.

[52] U.S. Cl. ............................................. 235/92 CC,
226/28, 178/69.5 R, 101/181
[51] Int. Cl. ............................................. G06m 3/02
[50] Field of Search ............................................. 226/2, 27,
28, 45, 100; 340/259, 168; 101/181, 183, 184;
235/61.11, 92 CC; 178/69.5

[56] References Cited
UNITED STATES PATENTS

| 2,980,858 | 4/1961 | Grondin et al. ............... | 178/69.5 |
| 3,068,787 | 12/1962 | Dall'Oglio et al. ............ | 226/28 |
| 3,440,547 | 4/1969 | Houcke ........................ | 178/69.5 |
| 3,454,926 | 8/1969 | Kinzelman .................... | 340/168 |

*Primary Examiner*—Thomas A. Robinson
*Attorney*—Hill, Sherman, Meroni, Gross and Simpson

ABSTRACT: A digital control system for controlling register of a moving web at successive stations wherein the set point at each station is automatically obtained and stored while the web is running in the desired register condition.

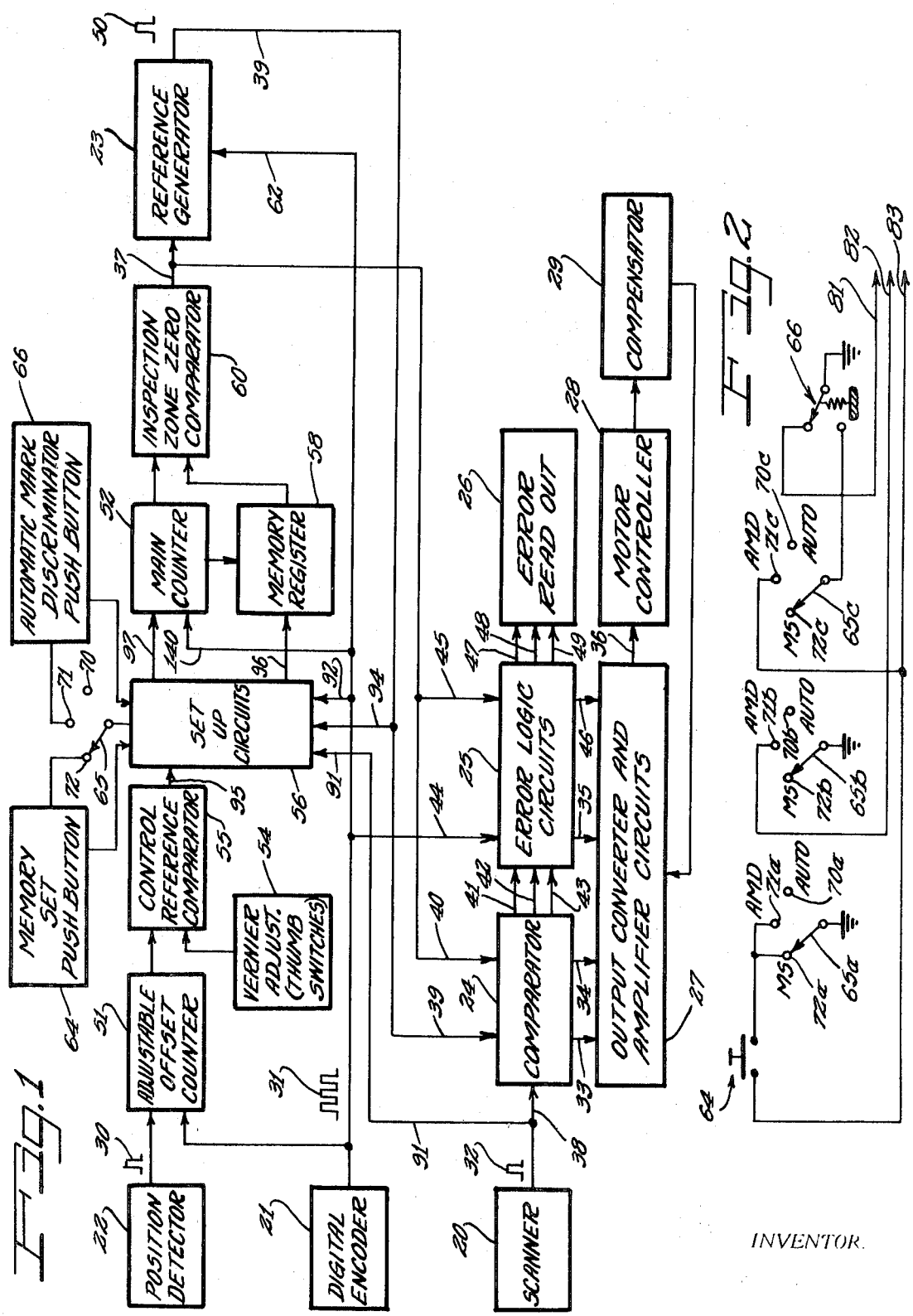

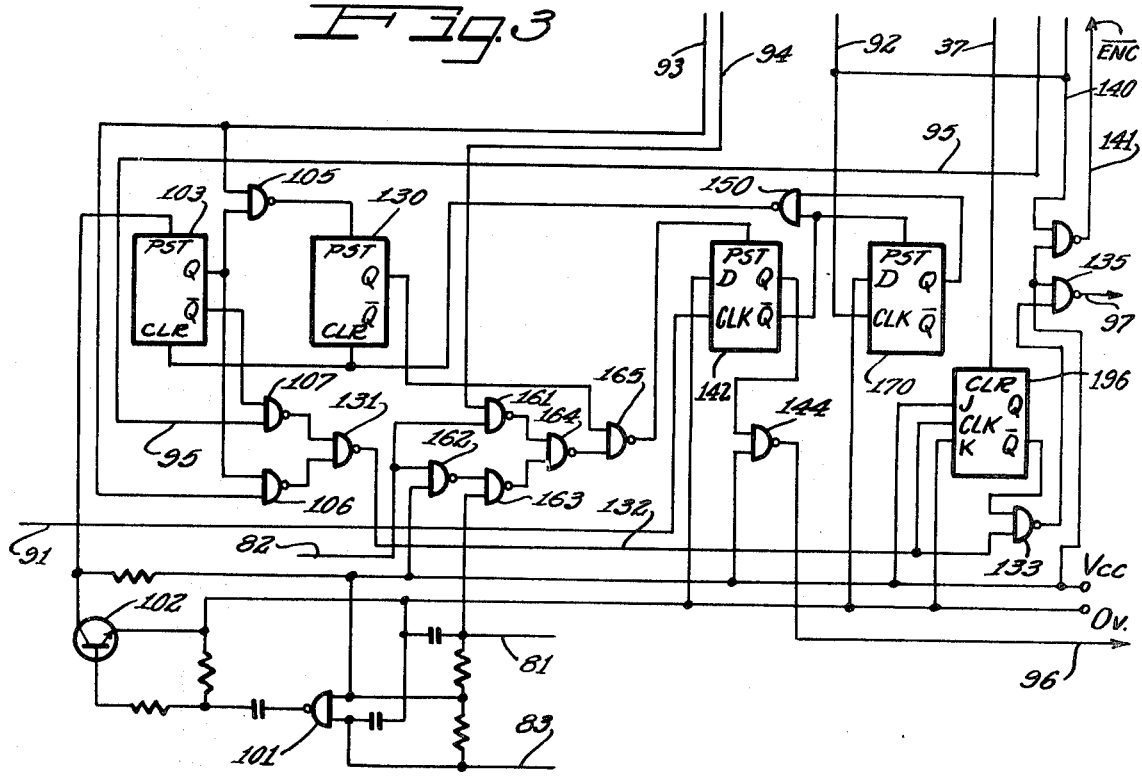

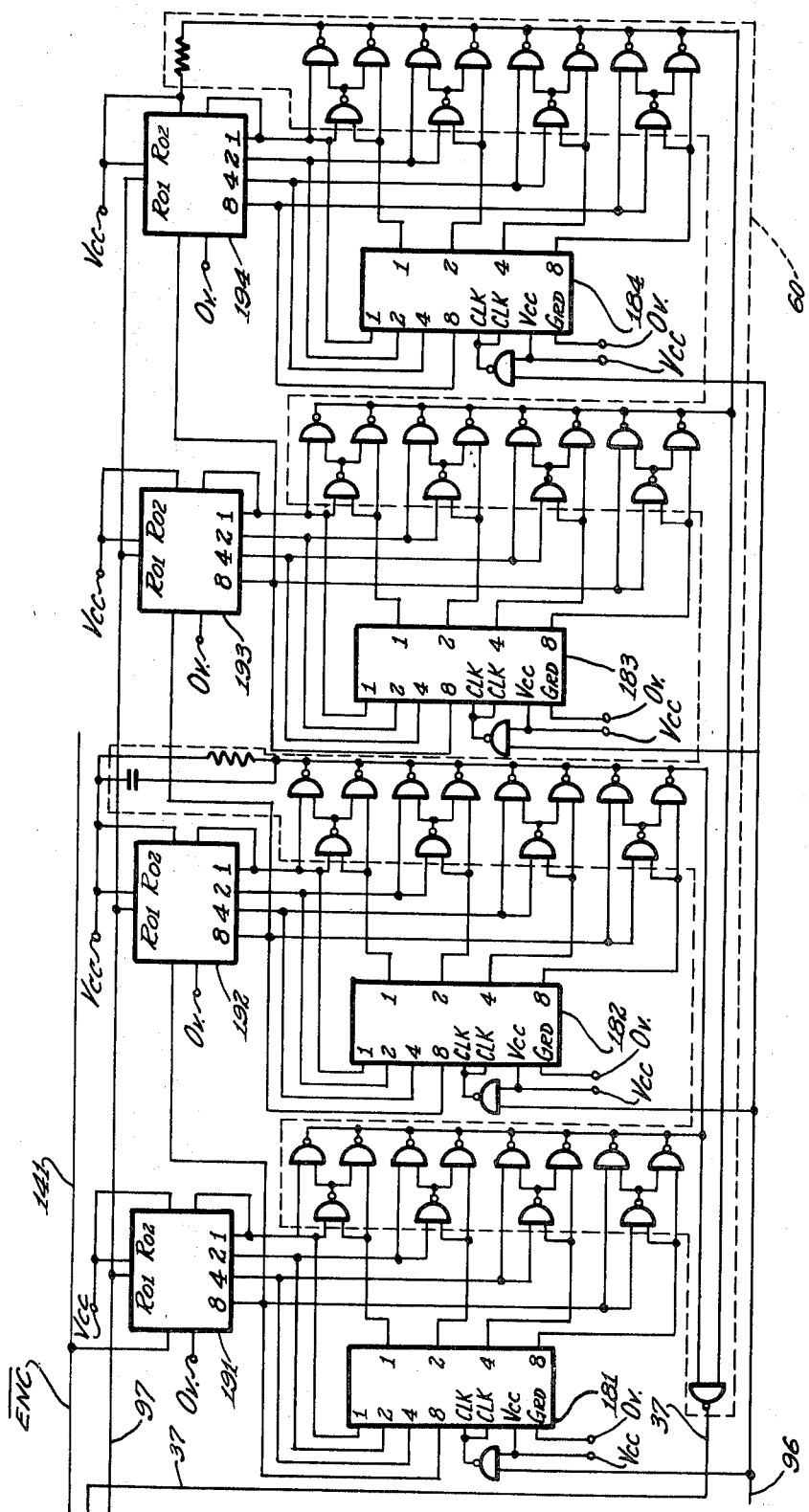

REGISTER CONTROL SYSTEM AND METHOD

CROSS-REFERENCE TO RELATED APPLICATION

The present application relates particularly to a register control system such as illustrated in a pending application Ser. No. 722,095 filed Apr. 17, 1968 and assigned to the assignee of the present application. The disclosure of this copending application is incorporated herein by reference in its entirety.

Reference is also made to U.S. Pat. No. 3,468,201 issued Sept. 23, 1969.

SUMMARY OF THE INVENTION

This invention relates to a digital control system and method for controlling register of a moving web at successive stations and relates particularly to such a system having provision for automatically establishing the operating set point for each station.

It is an object of the present invention to provide a digital control system and method for automatically establishing the operating set point while the web is running in the desired register condition.

A further object is to provide such a control system and method wherein a digital count equivalent to the desired set point is automatically stored in a memory register for subsequent control of the system.

Still another object of the invention is to provide a control system and method as in the foregoing objects wherein a fine adjustment of the set point can thereafter be manually effected during operation of the system.

Another and further object of the invention is to provide a digital register control system and method wherein a desired set point can be entered into the system by actuating a manual switch to select a particular visually observed reference mark on the web, so as to cause selection of the set point with respect to such mark at the remote digital register apparatus.

A more general object of the invention is to provide a highly accurate register control system wherein setup is quickly and conveniently effected.

Other objects, features and advantages of the invention will be readily apparent from the following description of a preferred embodiment thereof, taken in conjunction with the accompanying drawings although variations and modifications may be effected without departing from the spirit and scope of the novel concepts of the disclosure.

BRIEF DESCRIPTION OF THE DRAWINGS

FIG. 1 is an overall block diagram illustrating a system in accordance with the present invention;

FIG. 2 is a diagrammatic illustration of certain manual switching circuitry for the system of FIG. 1;

FIG. 3 illustrates preferred setup sequence control circuitry for the set up circuits component of FIG. 1;

FIG. 4 illustrates a preferred delaying counter circuit for the set up circuits component of FIG. 1; and FIG. 5 illustrates preferred circuitry for the main counter, memory register and inspection zone zero comparator components of the system of FIG. 1.

DETAILED DESCRIPTION OF THE PREFERRED EMBODIMENT

In the copending application Ser. No. 722,095 filed Apr. 17, 1968 there is illustrated a rotogravure printing press in which four colors may be applied to one side of the web and with provision for cutting the printed web into sheets. The four successive printing units are designated as stations A, B, C and D (not shown herein), and the cutoff unit is designated as station E (also not shown herein). The system of the prior application is utilized to automatically control circumferential, color-to-color register between the patterns applied to the web, at each of the printing stations, and to sever the web in register with the composite printed copy. The web after receiving the pattern printed at station A, which includes a register mark, passes in succession through stations B, C, and D. At each of the stations B, C, and D, the web receives a printed pattern in addition to that applied at station A. To obtain the desired results in the final composite copy, each of the separately applied patterns must be held in proper space relationship (register) on the web to each other. From printing station D, the web is directed to the cutoff station E. The system illustrated in FIG. 1 of the present application is applicable to the control of the compensator mechanism acting on the web in advance of any of the stations B, C, D and E of the prior application.

Certain of the components of FIG. 1 may correspond to components of the prior application and need not be described in detail herein. These components are listed herebelow with reference numerals in parenthesis indicating the corresponding components of the prior application:

| Component of FIG. 1 | Corresponding Components of Serial No. 722,095 |
|---|---|
| Scanner 20 | Scanner (20) |
| Digital Encoder 21 | Digital Encoder (21) |
| Position Detector 22 | Position Detector (22) |
| Reference Generator 23 | Reference Generator (50) |
| Comparator 24 | Comparator (54) |
| Error Logic Circuits 25 | Components (58), (60), (82), (110) and (120) |
| Error Readout 26 | Components (126), (130), (131), (132), (140) |
| Output Converter and Amplifier Circuits 27 | Components (90), (92), and (94) |
| Motor Controller 28 | Motor Controller (104) |
| Compensator 29 | Compensator (11), (13), (98) |

In general, in normal operation of the system of FIG. 1, position detector 22 emits a reference pulse 30 to initiate a cycle in which the register condition of the web with respect to a given station is to be observed. During the error-sensing cycle, a series of encoder pulses as indicated at 31 is supplied by digital encoder 21, each pulse representing a uniform increment of movement of the web at the given station. By way of specific example, digital encoder 21 may supply a total of 20,000 encoder pulses 31 for each error-sensing cycle which may correspond to one revolution of a gravure printing cylinder at the given station. In this instance, both the digital encoder 21 and the position detector 22 rotate in step with the printing cylinder with negligible backlash or other mechanical variations. The set point is determined by the digital circuitry without any requirement that the position detector by mechanically repositioned with respect to the printing cylinder. This eliminates any errors which might result from an adjustable mechanical coupling, the position detector being rigidly coupled to the printing cylinder shaft and the prior art adjustable coupling being completely eliminated.

The scanner 20 responds to the mark on the web as it approaches the station and thus provides a scanner pulse 32 whose time of occurrence relative to the reference pulse 30 is an accurate measure of the register condition of the web.

With proper set up of the system, the components 23-26 provide an accurate indication of any register error between the reference pulse 30 and the scanner pulse 32. The comparator 24 serves to sense the polarity of any error in register and supply this information via conductor 33 or 34 to component 27. Component 25 serves to count the number of encoder pulses 31 corresponding to any error in register and transmits this error count via line 35 to component 27 which then generates an analog error of proper polarity which is transmitted via line 36 to motor controller 28. The motor controller 28 then controls the compensator 29 in accordance with the magnitude and polarity of the error signal so as to attempt to restore the web to the desired register condition. The error readout component 26 may supply a visual digital display of the error count. In order to facilitate a correlation of FIG. 1 of the present application with the fourth figure of the copending application Ser. No. 422,095 reference numerals 33-49 have been applied in FIG. 1. These reference numerals are listed hereinafter with the corresponding reference numerals from the copending application shown in parenthesis immediately thereafter: 33 (64), 34 (66), 35 (360), 36 (none), 37 (48), 38 (56), 39 (52), 40 (62), 41 (68), 42 (70), 43 (72), 44 (78), 45 (86), 47 (EC), 48 (114), 49 (128).

It is an object of the present invention to provide circuitry for generating a set point pulse as indicated at 50 at the output of reference generator 23 which will coincide in time with the scanner pulse 32 in each error-sensing cycle so long as the web is in the proper register condition at the given station. The prior application Ser. No. 722,095 will give a clear example of the utility of the generation of a set point pulse such as 50, so that the further description herein will be with reference to the circuitry for generating the pulse 50 with the desired relationship to the scanner pulse 32. The set point pulse 50 corresponds to the pulse which is termed a reference pulse in the prior application, the pulse 50 being in the nature of an adjusted reference pulse occurring a predetermined number of encoder pulses after the initial reference pulse 30.

For generating the set point pulse 50 in each error-sensing cycle, a series of counter circuits are provided including an adjustable offset counter 51, a main counter 52 and reference generator 23. The adjustable offset counter 51 may count encoder pulses until a count is reached as manually selected by means of the vernier adjust component 54. When counter 51 reaches the count selected by component 54, a control reference comparator component 55 emits a signal to a setup circuits component 56 which then causes the main counter 52 to count encoder pulses until a count is reached corresponding to that in a memory register component 58. When the main counter 52 reaches the count stored in register 58, an inspection zone zero comparator component 60 emits a signal via line 37 to reference generator 23, and reference generator 23 then begins counting encoder pulses supplied to it via line 62, emitting the set point signal 50 after a further predetermined count.

In accordance with the concepts of the present invention, the setup circuits component 56 is operable in response to selection of a memory-set pushbutton represented at 64 by means of an operating mode switch 65 to insert into the memory register 58 the correct count such that the set point pulse 50 will be properly established. When the operating mode switch 65 is in its central position to connect with the automatic discriminator pushbutton component 66, the operator is enabled to provide a desired count in the memory egister 58 by manually selecting the correct mark on the web by means of visual observation at the controlled station. The right-hand position of the mode switch 65 as represented by terminal 70 corresponds to normal automatic operation of the system, during which register is actually being controlled by the system.

FIG. 2 shows detailed preferred switching circuitry embodying components 64-66 of FIG. 1. As there indicated, mode switch 65 includes movable contacts 65a, 65b and 65c for selective engagement with respective contacts 70a-70c, 71a-71 and 72a-72c. It will be observed that in the position of the mode switch shown in FIGS. 1 and 2, memory-set pushbutton 64 controls the application of ground potential to conductor 83, and conductor 82 is disconnected from ground potential.

With the mode switch 65 in the central position 71, FIG. 1, it will be observed that conductor 82 receives ground potential from movable contact 65b. Actuation of mark discriminator pushbutton 66 selectively removes ground potential from conductor 81, and applies ground potential via contact 65c to conductor 83.

In the automatic position of mode switch 65 indicated at 70 in FIG. 1, it is no longer possible to apply ground potential to conductor 83.

The significance of the switching circuitry of FIG. 2 will be better understood in conjunction with a description of the setup circuitry of FIG. 3.

Referring to FIG. 3, reference numerals 81-83 have been applied to the respective conductors in the lower left portion of the figure which connect with the conductors 81-83 respectively in FIG. 2. Other interconnecting conductors have been designated 91-97 in FIG. 3, conductors 91, 92 and 94-97 also appearing in FIG. 1. Conductor 93 at the upper center part of FIG. 3 connects with conductor 93 at the lower right in FIG. 4.

Referring to FIGS. 2 and 3, with mode switch 65 in the position shown actuation of the memory-set pushbutton 64, FIG. 2, supplies ground to conductor 83. This signal is transmitted via gate 101 and transistor 102 so as to preset flip-flop 103. This enables gates 105 and 106 and disables gate 107. Prior to this time the output of the control reference comparator 55 on line 95 has been effective in resetting main counter 52 through gates 107, 131, 133 and 135. After actuation of this pushbutton 64, the main counter 52 is reset by the output on line 93 of the counting circuit shown in FIG. 4.

Referring to FIG. 4, the signal from the control reference comparator 55, FIG. 1, via line 95 is inverted at 110 and serves to preset flip-flop 111 enabling gate 112. Thereafter, encoder pulses entering via line 92 at the lower part of FIG. 4 are counted by the counting chain which may include stages 114-117. Stage 114 may emit a carry pulse at line 118 for each 16 input pulses. Similarly stage 115 may emit a carry pulse at 119 for each 16 input pulses. Stages 116 and 117 are connected in tandem so as to switch to a "low" signal at output line 120 after two input pulses at line 119, "presetting" flip-flop 122. (With a low signal on the preset input designated PST of the flip-flops used in this device, signals at the clock input designated CLK have no effect on the output of the flip-flop.) After two additional input pulses at line 119, output line 120 will again switch to a "high" level. At this instant both inputs to gate 124 are "high," and the output of gate 124 will switch to a "low" level. This clears or resets flip-flop 111, blocking further passage of encoder pulses through gate 112 to the counting chain 114-117, FIG. 4. Since the preset input of flip-flop 122 is now "high" the next succeeding encoder pulse on line 92 will clock the output of flip-flop 122 to the "low" state (since input D of flip-flop 122 is connected to ground potential). This of course causes the output of gate 124 to return to the "high" level. Thus the stages 114-117 cause a positive-going output at line 120 after 1024 input encoder pulses at line 121 to provide a negative-going pulse at the output of gate 124 which is transmitted by gate 125 to line 93 as a positive-going pulse referred to as the "delayed reset pulse."

In FIG. 3, the positive-going pulse supplied to conductor 93 at the upper part thereof is transmitted by gates 106 and 131, conductor 132 and gate 133. The gate 133 is connected with a gate 135 so as to transmit a positive-going pulse to line 97 which serves to reset the main counter 52, FIG. 1. The pulse supplied to line 93 is also transmitted by gate 105 to "preset" flip-flop 130. The output of flip-flop 130 switches to a "high" level thus signaling that the main counter component 52 has been reset at the proper time and enabling gate 165.

The main counter will now count from zero the subsequently occurring encoder pulses supplied via line 140, FIG. 1. When the count in the main counter 52 reaches a number previously stored in memory register 58, the inspection zone zero comparator 60 generates a pulse on line 37 which starts reference generator 23 counting encoder pulses. After a fixed predetermined count, reference generator 23 emits the set point signal 50 which is transmitted to the set up circuits component 56 via line 94. This signal is further transmitted via gates 161, 164 and 165 and appears as a negative-going pulse at the preset input of flip-flop 142. This causes the "Q" output of flip-flop 142 to go "high" and the output of gate 144 to switch to a low level. The low signal applied to line 96 enables memory register components 181-184, FIG. 5 (constituting the memory register 58, FIG. 1) to track the count in main counter components 191-194, FIG. 5, respectively. The memory register 58 tracks the count in the main counter until such time as a scanner pulse occurs at line 91, FIG. 3. The occurrence of the scanner pulse at 91 serves to shift flip-flop 142, FIG. 3, to reset condition, causing the output of gate 144 to switch to a positive level on line 96 to interrupt the tracking of the memory register 58 with the main counter 52. The count in the memory register 58 will then be utilized in the automatic mode to generate the set point signal 50 at the proper point in each error-sensing cycle.

Flip-flop 142, FIG. 3, being reset causes flip-flop 170 and gate 150 to reset flip-flops 103 and 130. The resetting to flip-flop 103 enables gate 107, which thereafter responds to the input pulse at line 95, FIG. 3 to generate a main counter reset pulse at output line 97, bypassing the counter circuit of FIG. 4.

The counter circuit 114-117, FIG. 4, is selected to provide a counting value corresponding to the counting value provided by reference generator 23, so that the output pulse 50 will occur at the desired time relative to the reference pulse 30 during automatic operation. Since the reference generator 23 can selectively count to 256, 512 and 1,024, output lines 152 and 153 in FIG. 4 may be selectively connected in place of line 120 so as to provide the desired output pulse at line 93. Selection may be made by means of a plug and socket selective connection. A count of 256 pulses may be equivalent to 4.6° of arc on the printing cylinder, a count of 512 pulses may correspond to 9.3°, and a count of 1,024 pulses may correspond to 18.6°. If a clear track on the web is available, or if a clear area of substantial length precedes the mark, the equipment can operate with the connection actually illustrated in FIG. 4. When the scanner 20 must view the mark printed close to copy or illustrations, the alternative connections at 152 or 153 may be utilized in conjunction with a shortened inspection zone of a corresponding count length in the reference generator 23. In each case, the delaying counter 114-117 of FIG. 4 counts the same number of encoder pulses before providing its output as the number of counts provided by the reference generator 23 in the first half of its inspection zone, the set point pulse 50 representing the center of the inspection zone.

In the event that the system is not operating consistently with a given selected mark, the memory-set pushbutton 64 may be depressed whereupon a new scan pulse will take control of the tracking of the memory register components 181-184 of memory register 58.

In the automatic mark discriminator mode, the mode switch 65 is in the central position as indicated in FIG. 1, and movable contacts 65a-65c engage contacts 71a-71c, respectively. Ground potential is applied to line 82 through movable contact 65b and contact 71b. This conditions gates 161-164 to block from gate 165 the signal occurring on line 94 and to pass to gate 165 signals from pushbutton 66 on line 81. The discriminator pushbutton 66 is located physically adjacent the scanner component 20 at the station being controlled, and is remote from the operator's station which includes the mode selector switch 65 and the error readout display of component 26. When the discriminator pushbutton 66, FIG. 2 is depressed, ground potential is supplied to conductor 83 in FIG. 3, while a ground potential is removed from conductor 81. As long as conductor 81 remains at this higher potential, the lower one of the two inputs to gate 165 is also positive. It is necessary that pushbutton 66 remain depressed until at least one pulse has occurred on line 93, thus ensuring that the main counter 52 has been reset at the proper time. In addition it is also necessary that pushbutton 66 remain depressed until the clear area ahead of the mark on the web appears beneath scanner 20. When the delayed reset pulse occurs on line 93, flip-flop 130 is preset through gate 105. The resulting output of flip-flop 130 presets flip-flop 142 through gate 165. Presetting of flip-flop 142 causes a negative-going signal at line 96 for enabling components 181-184 in FIG. 5 to track the count in main counter components 191-194, respectively.

When the mark discriminator switch 66 is released as the clear track ahead of the desired mark appears beneath the scanner 20, ground potential is supplied to line 81 causing the output of gate 165 to go positive which permits flip-flop 142 to respond to a scanner pulse on line 91. The selected mark will produce a scanner pulse 32 at line 91 which will be effective to reset flip-flop 142 and interrupt tracking of the components 181-184 of memory register 58 and to reset flip-flops 103 and 130 as previously described. The memory register components 181-184 will thereafter control the main counter components 191-194 so as to emit the inspection zone zero pulse at line 37, FIG. 5 at the appropriate time so that the inspection zone will coincide with the selected mark.

SUMMARY OF OPERATION

The summary of operation can best be presented by means of a specific numerical example. Assume, for example, that the vernier adjust component 54 is set for a count of 500 and that the delaying counter 114-117 of FIG. 4 is arranged as shown for a count of 1,024 encoder pulses. The inspection zone defined by reference generator 23 will then have an extent of 1,024 pulses prior to the set pulse 50 and 1,024 pulses subsequent to the set point pulse 50 at which the system will respond to a scanner pulse such as indicated at 32, FIG. 1. Further assume that one scanner pulse occurs at a count of 3,500 and another occurs at a count of 5,200 after reference pulse 30.

With these assumptions, the reference pulse 30, FIG. 1 will initiate a counting cycle of the adjustable offset counter 51. When this count reaches a count of 500, control reference comparator 55 will supply a pulse at line 95.

Referring to FIG. 3, the pulse at line 95 of normally be transmitted by gate 107 and gates 131, 133 and 135 to begin a counting cycle of the main counter 52, FIG. 1. If components 181-184, FIG. 5, of memory register 58 are set to a count of 1,976, for example, an inspection zone zero pulse will appear at line 37 at the output of component 60, FIG. 1, after the occurrence of a total number of encoder pulses of 2,476. The inspection zone defined by reference generator 23 will extend from a total number of encoder pulses of 2,476 to a total number of encoder pulses of 4,524, with the set point pulse 50 occurring after a total number of encoder pulses of 3,500.

To illustrate how the count of 1,976 encoder pulses could be inserted into the memory register components 181-184, consider that when power is initially applied to the unit, a random number will appear in memory register 58. For our illustration, assume this number is 750. Assume that the memory-set pushbutton 64 is depressed in advance of the occurrence of a reference pulse 30. At a count of 500 after the occurrence of the reference pulse, a signal appears at line 95, FIG. 1 which causes the delaying counter 114-117, FIG. 4, to begin counting encoder pulses. At a total count of 1,524 encoder pulses, the delaying counter 114-117 would transmit a signal via line 93 to the circuitry of FIG. 3 resulting in a reset pulse at output line 97 to the main counter 52. The main counter would not count the 750 subsequently occurring encoder pulses, at which point (total count 2,274) the inspection zone zero comparator 60 will generate a signal on line 37. The signal on line 37 starts reference generator 23 which counts the next 1,024 encoder pulses and generates a delayed set point signal 50 (at a total count of 3,298). This signal is transmitted via conductors 39 and 94 to the circuits of FIG. 3 and results in a signal on output line 96 of FIG. 3 which causes memory register components 181-184, FIG. 5, to track the count in the main counter stages 191-194.

If now, the scanner pulse occurs at a total count of 3,500 encoder pulses, this scanner pulse will appear at line 91, FIG. 3 to cause an output signal at line 96, FIG. 3 which interrupts the tracking by the components 181-185, FIG. 5, at the time that the count in the main counter was equal to the total count of 3,500 encoder pulses less the counts of 500 and 1,024 introduced by the counters 51 and 114-117, or a count of 1,976 as previously referred to.

In the next cycle, adjustable offset counter 51 would cause resetting of the main counter 52 at a total count of 20,500, (500 encoder pulses after reference pulse 30), and component 60, FIG. 1, would emit a signal at line 37 at a total count of 22,476 encoder pulses. The set point signal 50 would then occur at a total count of 23,500 encoder pulses.

If now the memory-set pushbutton 64 were depressed in the next error-sensing cycle, for example after a total number of encoder pulses of 40,000, the output pulse from counter 51 at a total count of 40,500 encoder pulses would start the counting by the delaying counter 114–117, FIG. 4. Then at a total count of 41,524, the output from the delaying counter would cause the resetting of the main counter components 191–194, FIG. 5. Thereafter, at a total count of 43,500, an output would occur at output conductor 37, FIG. 5, to initiate the counting by the reference generator 23. When a set point pulse 50 occurs at a total count of 44,524, this pulse is supplied via line 94 to produce an output at 96, FIG. 3, causing the memory register components 181–184 to start tracking the main counter components 191–194. If now a new scanner pulse occurs at a total count of 45,200, memory register components 181–184 will store the corresponding count of 3,676, from components 191–194, and this will provide a new set point for the system which will then respond to the mark occurring at the total count of 45,200 rather than the mark which would be expected at 43,500 had the memory-set pushbutton not been depressed.

Thus with the response set to the new mark on the web, the set point signal 50 would now occur at a total count of 65,200 in the next cycle of the system.

Similarly in the mark discriminator mode of operation, release of the pushbutton 66 after the mark normally occurring at a total number of encoder pulses of 43,500 and before the mark occurring at the number of encoder pulses 45,200 would result in the storing in the memory register of the count of 3,676, with the result that the first mark on the web was visually rejected while the second mark was selected and the corresponding count inserted in the memory register component.

The foregoing numerical example assumes, of course, that each error-sensing cycle has a duration equivalent to 20,000 encoder pulses from the digital encoder 21. If a persistent error is noted during automatic operation, the set point signal 50 can be shifted by changing the vernier adjust thumb switches of component 54 to some other count between 000 and 999. The main counter 52 starts counting after the "fine adjust" count is reached, whether the vernier adjust component be set to 108, 460, 610 or any other desired count between 0 and 999. The delaying counter components 114–117, FIG. 4, are of course only used during the set up perations, and are not used during automatic operation.

By way of specific example components 103, 130, 142 and 170 of FIG. 3 may be provided by component Ser. No. 7474 N Texas Instruments Inc., of Dallas, Texas. Flip-flop component 196, FIG. 3 may be Ser. No. 7473 N of the same company. Components 114 and 115, FIG. 4 may be Ser. No. 7493 N, while components 116 and 117 may be Ser. No. 7473 N. Referring to FIG. 5, components 191–194 may be type Ser. No. 7493 N, while components 181–184 may be type Ser. No. 7475 N.

The reference generator 23 may be termed an "inspection zone counter" which is set to provide a predetermined count prior to emitting a set point signal. The function of this component 23 is to define the interval in which the scanner signal 32 may occur during correct operation of the system.

I claim as my invention:

1. The method of setting up a digital register control system which includes a main counter having a memory register for determining the counting action thereof and an inspection zone counter set to provide a predetermined count prior to emitting a set point signal, which method comprises initiating a counting sequence in response to the occurrence of one of a reference signal and a scanner signal interposing in the counting sequence a delaying counter set to provide a count corresponding to the predetermined count of said inspection zone counter and delaying the counting sequence of the main counter until after completion of the counting cycle by the delaying counter, and sensing the occurrence of the other of the reference signal and scanner signal during the counting sequence and storing in the memory register the count of the main counter at the time of occurrence of such other signal, for use in controlling subsequent operation of the main counter in the absence of such delaying counter.

2. In apparatus for providing a set point signal for use in sensing register errors with respect to a moving web, means for generating encoder pulses as a function of web movement and for generating a cyclically occurring reference signal to initiate successive error-sensing cycles, scanner means for generating a scanner signal whose time of occurrence is responsive to register errors relative to said reference signal in each error-sensing cycle, and counting means including a main counter with a memory register for storing a count value controlling the count at which the main counter supplies an output signal, said counting means being operable to count encoder pulses beginning with the occurrence of one of said reference signals and to emit a set point signal which is to be time coincident with one of said scanner signals, wherein the improvement comprises setup circuitry for operation in a setup cycle while the web has substantially a zero registration error to cause counting of encoder pulses beginning with the occurrence of a reference signal and ending with the occurrence of a scanner signal to provide an encoder count equal to the correct spacing between the reference signal and the scanner signal, and means operable during the setup cycle only for delaying the counting of encoder pulses be the main counter for a time interval corresponding to the time spacing between the occurrence of the output signal from the main counter and the set point signal in normal operation, thereby to produce a count in the main counter of the correct value for normal operation, said memory register of said main counter being automatically operable to store said count of the main counter during the setup cycle and thereafter to control the main counter in accordance with such count during normal operation where the delaying time interval is omitted.

3. Apparatus according to claim 2 with said setup circuitry having a memory-set switch for selective actuation to initiate a setup during which a new count value is automatically stored in said memory register as a function of a scanner signal occurring after actuation of the memory-set switch is completed, whereby a different scanner signal may be selected from which to determine register errors.

4. Apparatus according to claim 2 wherein a mark discriminator switch is connected with said setup circuitry but is physically located adjacent said scanner means, said switch being actuatable to initiate a setup cycle with respect to a visually observed mark on the web.